US012294173B2

(12) United States Patent
Takagi

(10) Patent No.: US 12,294,173 B2
(45) Date of Patent: May 6, 2025

(54) CONNECTOR

(71) Applicant: SUMITOMO WIRING SYSTEMS, LTD., Mie (JP)

(72) Inventor: Kohei Takagi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 350 days.

(21) Appl. No.: 17/786,762

(22) PCT Filed: Dec. 8, 2020

(86) PCT No.: PCT/JP2020/045606
§ 371 (c)(1),
(2) Date: Jun. 17, 2022

(87) PCT Pub. No.: WO2021/131664
PCT Pub. Date: Jul. 1, 2021

(65) Prior Publication Data
US 2023/0022889 A1 Jan. 26, 2023

(30) Foreign Application Priority Data
Dec. 25, 2019 (JP) ................................ 2019-234543

(51) Int. Cl.
*H01R 13/436* (2006.01)
*H01R 13/502* (2006.01)
(Continued)

(52) U.S. Cl.
CPC ......... *H01R 13/436* (2013.01); *H01R 13/502* (2013.01); *H01R 13/516* (2013.01); *H01R 13/639* (2013.01)

(58) Field of Classification Search
CPC .. H01R 13/436; H01R 13/502; H01R 13/516; H01R 13/639
(Continued)

(56) References Cited

U.S. PATENT DOCUMENTS 8,353,732 B2 * 1/2013 Ito ...................... H01R 13/4362 439/752
10,326,227 B2 * 6/2019 Miyamura ......... H01R 13/4362
(Continued)

FOREIGN PATENT DOCUMENTS

JP 2012-129111 A 7/2012
JP 2018-181555 A 11/2018

OTHER PUBLICATIONS

International Search Report issued on Feb. 22, 2021 for WO 2021/131664 A1 (4 pages).

*Primary Examiner* — Gary F Paumen
(74) *Attorney, Agent, or Firm* — Venjuris, P.C.

(57) ABSTRACT

A connector 10 is provided with a connector housing 11 formed with a first cavity 16 extending in a front-rear direction, a first terminal 12 accommodated in the first cavity 16, a front mask 13 to be attached to a front end part of the connector housing 11, and a lid member 14 to be mounted on an upper surface of the connector housing 11. The front mask 13 is attached to the connector housing 11 from above. The lid member 14 at least partially covers an upper surface of the front mask 13. The front mask 13 includes a front cavity 35 extending in the front-rear direction. A front end part of the first terminal 12 is accommodated in the front cavity 35.

5 Claims, 15 Drawing Sheets

(51) Int. Cl.
*H01R 13/516* (2006.01)
*H01R 13/639* (2006.01)

(58) Field of Classification Search
USPC .......................................................... 439/752
See application file for complete search history.

(56) References Cited

U.S. PATENT DOCUMENTS

| | | | |
|---|---|---|---|
| 2012/0021633 | A1 | 1/2012 | Ito |
| 2019/0044270 | A1 | 2/2019 | Miyamura et al. |

* cited by examiner

CONNECTOR

CROSS REFERENCE TO RELATED APPLICATIONS

This application is a national phase of PCT application No. PCT/JP2020/045606, filed on 8 Dec. 2020, which claims priority from Japanese patent application No. 2019-234543, filed on 25 Dec. 2019, all of which are incorporated herein by reference.

TECHNICAL FIELD

The present disclosure relates to a connector.

BACKGROUND

Conventionally, a connector is known from Japanese Patent Laid-open Publication No. 2010-170723. This connector is a connector including two first and second connector housings to be stacked and united with each other, the second connector housing is integrally formed with a connector front wall for closing the front ends of terminal accommodation chambers of the first connector housing, and terminal insertion openings open in that connector front wall are separated from the fronts of first terminals and located in front of first locking lances for locking the first terminals when the both connector housings are held at a partial locking position.

PRIOR ART DOCUMENT

Patent Document

Patent Document 1: JP 2010-170723 A

SUMMARY OF THE INVENTION

Problems to be Solved

In the above connector, the position of the connector front wall relative to the terminal insertion openings when the both connector housings are held at the partial locking position and that when the both connector housings are held at full locking position are shifted. Thus, the first terminals cannot be accommodated inside the connector front wall. As a result, there has been a problem that a length of the connector is increased by the connector front wall.

The present disclosure was completed on the basis of the above situation and aims to reduce the size of a connector in a front-rear direction.

Means to Solve the Problem

The present disclosure is directed to a connector with a connector housing formed with a first cavity extending in a front-rear direction, a first terminal accommodated in the first cavity, a front mask to be attached to a front end part of the connector housing, and a lid member to be mounted on an upper surface of the connector housing, wherein the front mask is attached to the connector housing from above, the lid member at least partially covers an upper surface of the front mask, the front mask includes a front cavity extending in the front-rear direction, and a front end part of the first terminal is accommodated in the front cavity.

Effect of the Invention

According to the present disclosure, it is possible to reduce the size of a connector in a front-rear direction.

DETAILED DESCRIPTION TO EXECUTE THE INVENTION

Description of Embodiments of Present Disclosure

Figure 1:
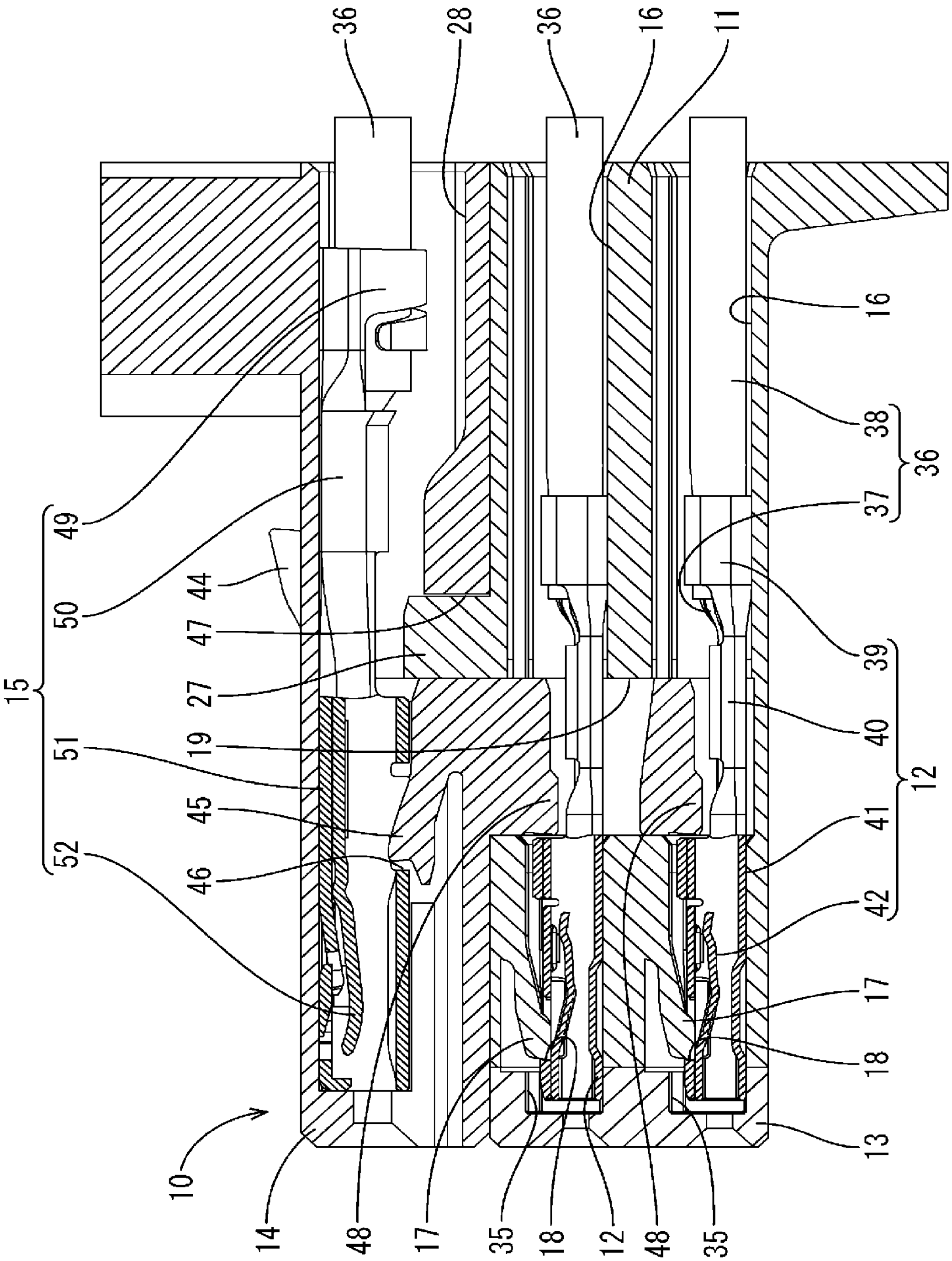
FIG. 1 is a section along I-I of FIG. 9 showing a connector according to a first embodiment.

First, embodiments of the present disclosure are listed and described.

(1) The connector of the present disclosure is provided with a connector housing formed with a first cavity extending in a front-rear direction, a first terminal accommodated in the first cavity, a front mask to be attached to a front end part of the connector housing, and a lid member to be mounted on an upper surface of the connector housing, wherein the front mask is attached to the connector housing from above, the lid member at least partially covers an upper surface of the front mask, the front mask includes a front cavity extending in the front-rear direction, and a front end part of the first terminal is accommodated in the front cavity.

Since the lid member at least partially covers the upper surface of the front mask, upward detachment of the front mask is suppressed.

Since the front end part of the first terminal is accommodated in the front cavity, a length in the front-rear direction of the connector housing can be shortened. In this way, the connector can be reduced in size in the front-rear direction.

(2) Preferably, a first terminal retainer insertion recess open upward and communicating with the first cavity is provided in an upper wall of the connector housing, the lid member is provided with a first terminal retainer portion projecting downward, and the first terminal retainer portion enters the first terminal retainer insertion recess and the first cavity to lock the first terminal accommodated in the first cavity with the lid member assembled with the connector housing.

Since the first terminal can be locked by the lid member, it is not necessary to provide a retainer for the first terminal. In this way, the number of components of the connector can be reduced.

(3) Preferably, the lid member is formed with a second cavity extending in the front-rear direction and a second terminal different from the first terminal is accommodated in the second cavity.

Since the second terminal can be accommodated in the lid member, the number of the terminals capable of being accommodated in the connector can be increased as a whole.

(4) Preferably, the lid member is provided with a second terminal retainer insertion recess open downward and communicating with the second cavity, a second terminal retainer portion projecting upward is provided on an upper wall of the connector housing, and the second terminal retainer portion enters the second terminal retainer insertion recess and the second cavity to lock the second terminal accommodated in the second cavity with the lid member assembled with the connector housing.

Since the second terminal can be locked by the second terminal retainer portion, it is not necessary to provide a retainer for the second terminal. In this way, the number of components of the connector can be reduced.

(5) Preferably, a lock portion to be engaged with a mating connector is provided on an upper surface of the lid member.

Since the lid member is provided with the lock portion, the connector and the mating connector can be engaged.

Details of Embodiments of Present Disclosure

Hereinafter, embodiments of the present disclosure are described. The present disclosure is not limited to these illustrations and is intended to be represented by claims and include all changes in the scope of claims and in the meaning and scope of equivalents.

First Embodiment

A first embodiment of the present disclosure is described with reference to FIGS. 1 to 9. As shown in FIG. 1, a connector 10 according to this embodiment includes a connector housing 11, first terminals 12 to be accommodated into the connector housing 11, a front mask 13 to be attached to a front end part of the connector housing 11, a lid member 14 to be mounted on an upper side of the connector housing 11 and second terminals 15 to be accommodated into the lid member 14. The connector 10 is connected to an unillustrated mating connector. In the following description, a connecting direction of the connector 10 is described as a forward direction. A vertical direction is based on a vertical direction in FIG. 1. Further, for a plurality of identical members, only some may be denoted by a reference sign and the other may not be denoted by the reference sign.

[Connector Housing 11]

Figure 2:
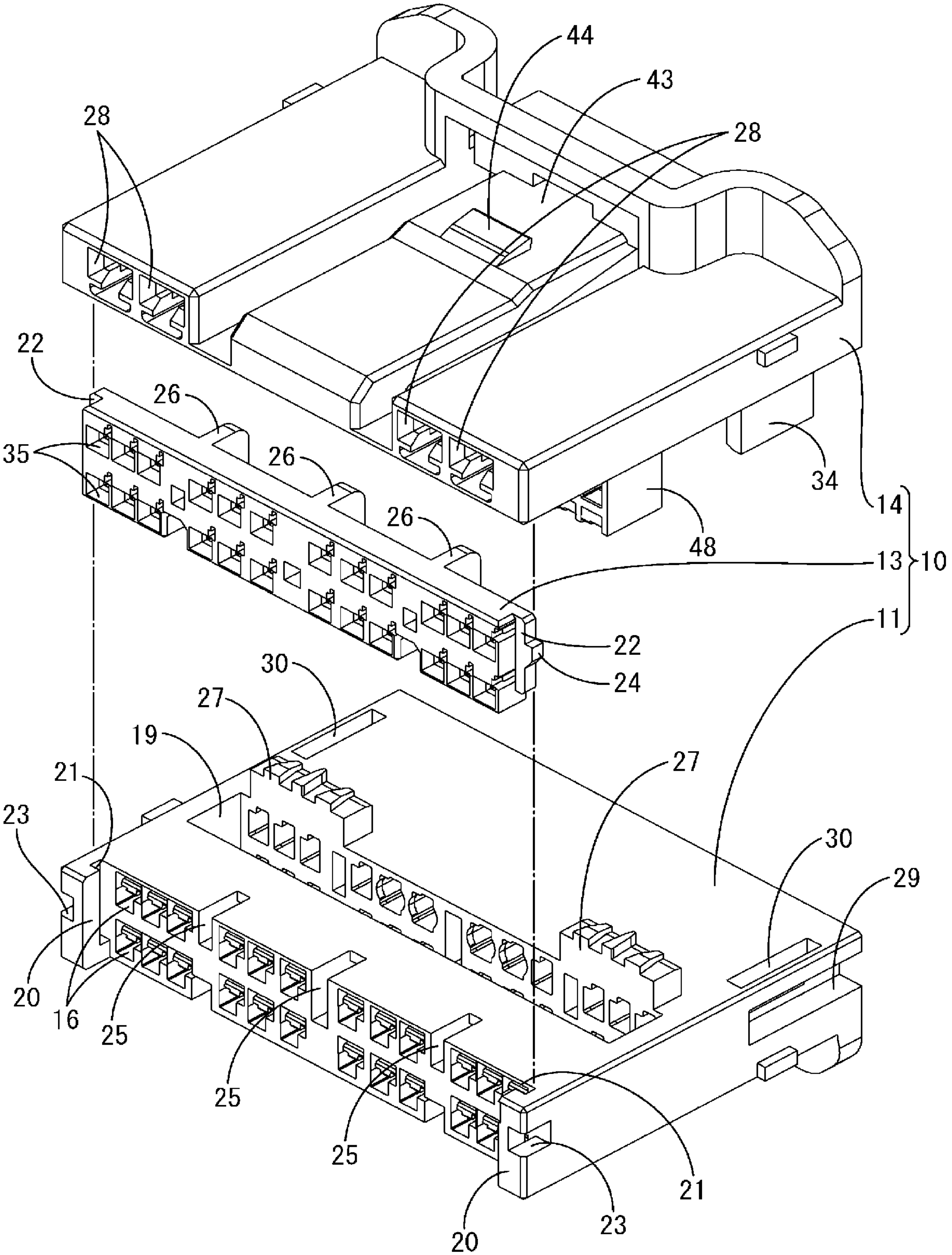
FIG. 2 is an exploded perspective view of the connector.

As shown in FIG. 2, the connector housing 11 is formed by injection molding an insulating synthetic resin. The connector housing 11 has a rectangular parallelepiped shape flat in the vertical direction. The connector housing 11 includes a plurality of first cavities 16 extending in a front-rear direction. In the connector housing 11, a plurality of (twelve in this embodiment) first cavities 16 are arranged in a row in a lateral direction in each of a plurality of stages (two stages in this embodiment) in the vertical direction. Each first cavity 16 is open forward and rearward. The first terminal 12 is accommodated into each first cavity 16 (see FIG. 1).

As shown in FIG. 1, a first locking lance 17 obliquely projecting to a lower front side is formed at the upper wall of the first cavity 16. A front end part of the first locking lance 17 is locked to a hole edge part of a locking hole 18 formed in the first terminal 12 from behind.

As shown in FIG. 2, the upper wall of the connector housing 11 is formed with a first terminal retainer insertion recess 19 depressed downward. The first terminal retainer insertion recess 19 communicates with the first cavities 16. The first terminal retainer insertion recess 19 has a rectangular shape elongated in the lateral direction when viewed from above.

As shown in FIG. 2, the front end part of the connector housing 11 is provided with extending walls 20 respectively extending forward from both left and right ends. A vertical height of the extending wall 20 is equal to a height of the connector housing 11. An engaging groove 21 extending in the vertical direction is formed in a laterally inner wall surface of the extending wall 20. The engaging groove 21 has a bottom portion in a lower end part and is open upward. A side guide rib 22 of the front mask 13 enters the engaging groove 21 from above as described later.

The extending wall 20 is formed with a front engaging recess 23 recessed inwardly from a widthwise (lateral) outer side near a substantially vertical center. The front engaging recess 23 communicates with the engaging groove 21. An engaging claw 24 of the front mask 13 is engaged with an opening edge part of this front engaging recess 23 from below.

As shown in FIG. 2, the front end part of the connector housing 11 is formed with a plurality of (three in this embodiment) guide grooves 25 recessed downward from an upper surface. Rear guide ribs 26 of the front mask 13 are inserted into the guide grooves 25 as described later.

As shown in FIG. 2, second terminal retainer portions 27 projecting upward are formed at positions behind the first terminal retainer insertion recess 19 on the upper surface of the connector housing 11. The second terminal retainer portions 27 are formed at positions near both lateral end parts of the connector housing 11. The second terminal retainer portions 27 are provided at positions corresponding to second cavities 28 formed in the lid member 14 as described later.

As shown in FIG. 2, rear engaging recesses 29 are formed to be recessed inward from widthwise (lateral) outer sides at positions near a rear end part in both left and right side walls of the connector housing 11. An insertion hole 30 penetrating to be open upward is formed in the upper wall of the rear engaging recess 29. A partial locking portion 31 and a full locking portion 32 provided at a position below the partial locking portion 31 are arranged side by side in the vertical direction on the side wall of the rear engaging recess 29. The partial locking portion 31 and the full locking portion 32 are formed to project outward in the width direction of the connector housing 11. The partial locking portion 31 and the full locking portion 32 are fit into a locking groove 33 of the lid member 14 and locked to the inner wall of the locking groove 33 as described later.

As shown in FIG. 2, the insertion holes 30 penetrating through the upper wall of the connector housing 11 and communicating with the rear engaging recesses 29 are formed at positions near the rear end part and both left and right end parts in the upper wall of the connector housing 11. The insertion hole 30 has a rectangular shape elongated in the front-rear direction. The inner shape of the insertion hole 30 is formed such that a locking piece 34 of the lid member 14 to be described later is insertable through the insertion hole 30.

[Front Mask 13]

As shown in FIG. 2, the front mask 13 is formed by injection molding an insulating synthetic resin. The front mask 13 is in the form of a flat plate elongated in the lateral direction and flat in the front-rear direction. As shown in FIG. 1, a height of the front mask 13 is equal to that of the connector housing 11 in the vertical direction. The front mask 13 includes a plurality of front cavities 35 penetrating in the front-rear direction. The front cavities 35 are formed at positions corresponding to the first cavities 16 of the connector housing 11 with the front mask 13 attached to the connector housing 11. The number of the front cavities 35 is equal to that of the first cavities 16.

As shown in FIG. 2, the side guide ribs 22 projecting outward and extending in the vertical direction are formed on both left and right end parts of the front mask 13. A width in the front-rear direction of the side guide rib 22 is set equal to or somewhat smaller than that of the engaging groove 21 of the connector housing 11. The side guide rib 22 is formed from an upper end part of the front mask 13 to a position somewhat above a lower end part of the front mask 13. The side guide rib 22 is formed with the engaging claw 24 projecting outward near a vertical center. This engaging claw 24 is engaged with the opening edge of the front engaging recess 23 of the connector housing 11 from below. In this way, the front mask 13 is so assembled with the connector housing 11 as not to come off upward.

As shown in FIG. 2, a plurality of (three in this embodiment) rear guide ribs 26 projecting rearward and extending in the vertical direction are formed at intervals in the lateral direction on the rear surface of the front mask 13. The rear guide ribs 26 are formed at positions corresponding to the guide grooves 25 of the connector housing 11 with the front mask 13 attached to the connector housing 11. A width in the lateral direction of the rear guide rib 26 is set equal to or somewhat smaller than that of the guide groove 25 of the connector housing 11.

As shown in FIG. 1, with the front mask 13 attached to the connector housing 11, the upper surface of the front mask 13 and that of the connector housing 11 are flush and the front surface of the front mask 13 and that of the connector housing 11 are flush.

[First Terminal 12]

As shown in FIG. 1, the first terminal 12 is inserted into the first cavity 16 from behind. The first terminal 12 is formed by press-working a metal plate material into a predetermined shape. The first terminal 12 is connected to a front end part of a wire 36. The wire 36 includes a core wire 37 and an insulation coating 38 made of insulating synthetic resin and surrounding the outer periphery of the core wire 37. The core wire 37 is formed by stranding a plurality of metal thin wires. The first terminal 12 includes an insulation barrel 39 to be crimped to the outer periphery of the insulation coating 38 of the wire 36 and a wire barrel 40 connected in front of the insulation barrel 39 and to be crimped to the outer periphery of the core wire 37.

A tubular connecting tube portion 41 to be connected to an unillustrated mating terminal is provided in front of the wire barrel 40. A resiliently deformable resilient piece 42 is disposed inside the connecting tube portion 41. The mating terminal inserted into the connecting tube portion 41 from front is sandwiched between the resilient piece 42 and an inner wall of the connecting tube portion 41, whereby the mating terminal and the first terminal 12 are electrically connected.

The connecting tube portion 41 is in the form of a rectangular tube extending in the front-rear direction. The locking hole 18 penetrates through the upper wall of the connecting tube portion 41. A tip part of the first locking lance 17 is locked to a hole edge part of the locking hole 18 from behind, whereby the first terminal 12 is held in the first cavity 16 with a rearward movement restricted.

A front end part of the connecting tube portion 41 formed in the first terminal 12 is located in the front cavity 35 of the front mask 13 assembled with the connector housing 11.

[Lid Member 14]

As shown in FIG. 2, the lid member 14 is formed by injection molding an insulating synthetic resin. The lid member 14 has a rectangular parallelepiped shape flat in the vertical direction. A length in the front-rear direction of the lid member 14 is set equal to that of the connector housing 11 or set to a length to be recognized as substantially equal even if these lengths are not equal.

As shown in FIG. 2, the lid member 14 is formed with a plurality of (four in this embodiment) second cavities 28 extending in the front-rear direction. The four second cavities 28 include two second cavities 28 formed side by side at positions near a left end part of the lid member 14 and two second cavities 28 formed side by side at positions near a right end part. Each second cavity 28 is open forward and rearward. As shown in FIG. 1, the second terminal 15 is accommodated in each second cavity 28.

As shown in FIG. 2, the lid member 14 is formed with a lock arm 43 extending rearward from a front end part of the lid member 14 at a lateral center position. A front end part of the lock arm 43 is connected to the upper wall of the lid member 14. The lock arm 43 is resiliently deformable in the vertical direction with the front end as a fulcrum. A lock portion 44 projecting upward is formed on the upper surface of the lock arm 43. The unillustrated mating connector and the connector 10 are held in a connected state by locking the mating connector by the lock portion 44.

As shown in FIG. 1, a second locking lance 45 obliquely projecting to an upper front side is formed at the lower wall of the second cavity 28. A front end part of the second locking lance 45 is locked to a hole edge part of a locking hole 46 formed in the second terminal 15 from behind.

As shown in FIG. 1, the lower wall of the lid member 14 is formed with second terminal retainer insertion recesses 47 depressed upward. The second terminal retainer insertion recesses 47 communicate with the second cavities 28. The outer shape of the second terminal retainer portion 27 formed in the connector housing 11 is the same as or somewhat smaller than the inner shape of the second terminal retainer insertion recess 47. The second terminal retainer portions 27 are formed to be insertable into the second terminal retainer insertion recesses 47 with the lid member 14 assembled with the connector housing 11.

[First Terminal Retainer Portion 48]

Figure 3:
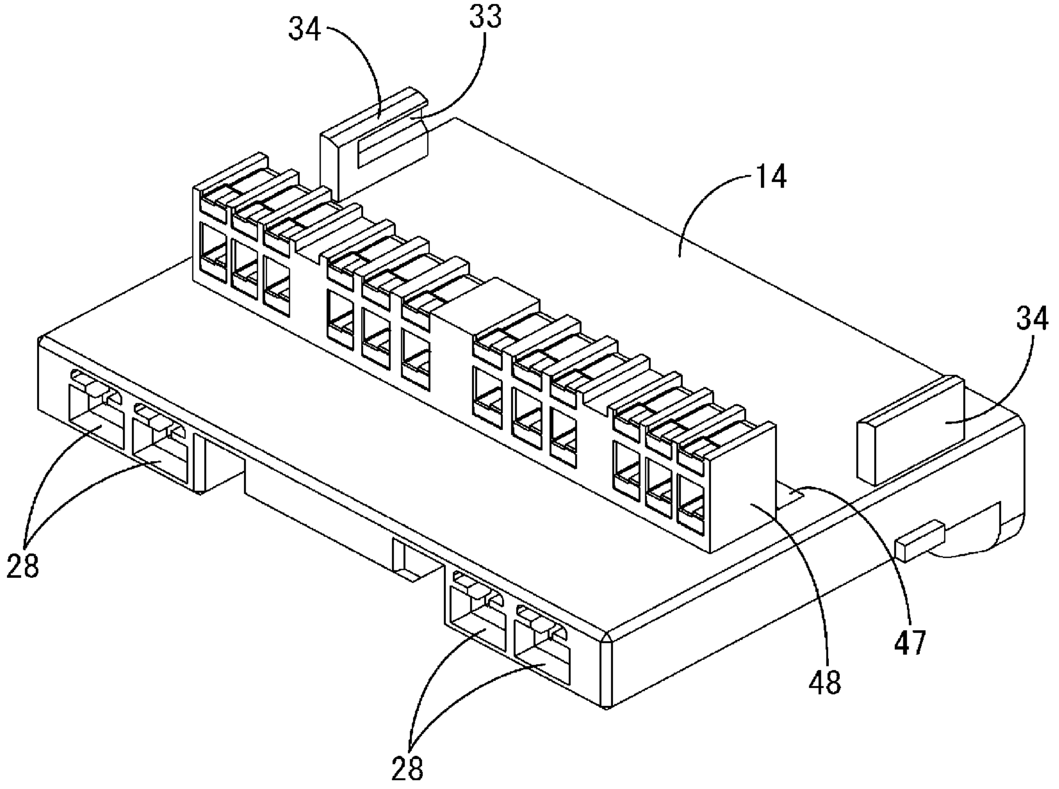
FIG. 3 is a perspective view showing a lower surface of a lid member.

As shown in FIG. 3, a first terminal retainer portion 48 projecting downward is formed at a position in front of the second terminal retainer insertion recesses 47 in the lower surface of the lid member 14. The first terminal retainer portion 48 is in the form of a wall extending in the lateral direction. The outer shape of the first terminal retainer portion 48 is set same as or somewhat smaller than the inner shape of the first terminal retainer insertion recess 19 of the connector housing 11. The first terminal retainer portion 48 is formed to be insertable into the first terminal retainer insertion recess 19 with the lid member 14 assembled with the connector housing 11.

[Second Terminal 15]

As shown in FIG. 1, the second terminal 15 is inserted into the second cavity 28 from behind. The second terminal 15 is formed by press-working a metal plate material into a predetermined shape. The second terminal 15 is connected to a front end part of a wire 36. The second terminal 15 includes an insulation barrel 49 to be crimped to the outer periphery of an insulation coating 38 and a wire barrel 50 connected in front of the insulation barrel 49 and to be crimped to the outer periphery of a core wire 37.

A tubular connecting tube portion 51 to be connected to an unillustrated mating terminal is provided in front of the wire barrel 50. A resiliently deformable resilient piece 52 is disposed inside the connecting tube portion 51. A mating terminal inserted into the connecting tube portion 51 from front is sandwiched between the resilient piece 52 and an inner wall of the connecting tube portion 51, whereby the mating terminal and the second terminal 15 are electrically connected.

The connecting tube portion 51 is in the form of a rectangular tube extending in the front-rear direction. The locking hole 46 penetrates through the lower wall of the connecting tube portion 51. A tip part of the second locking lance 45 is locked to a hole edge part of the locking hole 46 from behind, whereby the second terminal 15 is held in the second cavity 28 with a rearward movement restricted.

[Locking Pieces 34]

As shown in FIG. 3, the locking pieces 34 respectively projecting downward are formed at positions near a rear end part and both left and right end parts on the lower surface of the lid member 14. The locking pieces 34 are in the form of plates extending in the front-rear direction and flat in the lateral direction.

The locking groove 33 is formed to extend forward from a rear end part of the locking piece 34 in the laterally inner surface of each locking piece 34. The locking groove 33 extends up to a position somewhat behind the front end of the locking piece 34. The inner shape of the locking groove 33 is formed such that the partial locking portion 31 and the full locking portion 32 formed in the connector housing 11 are fittable thereinto.

Figure 4:
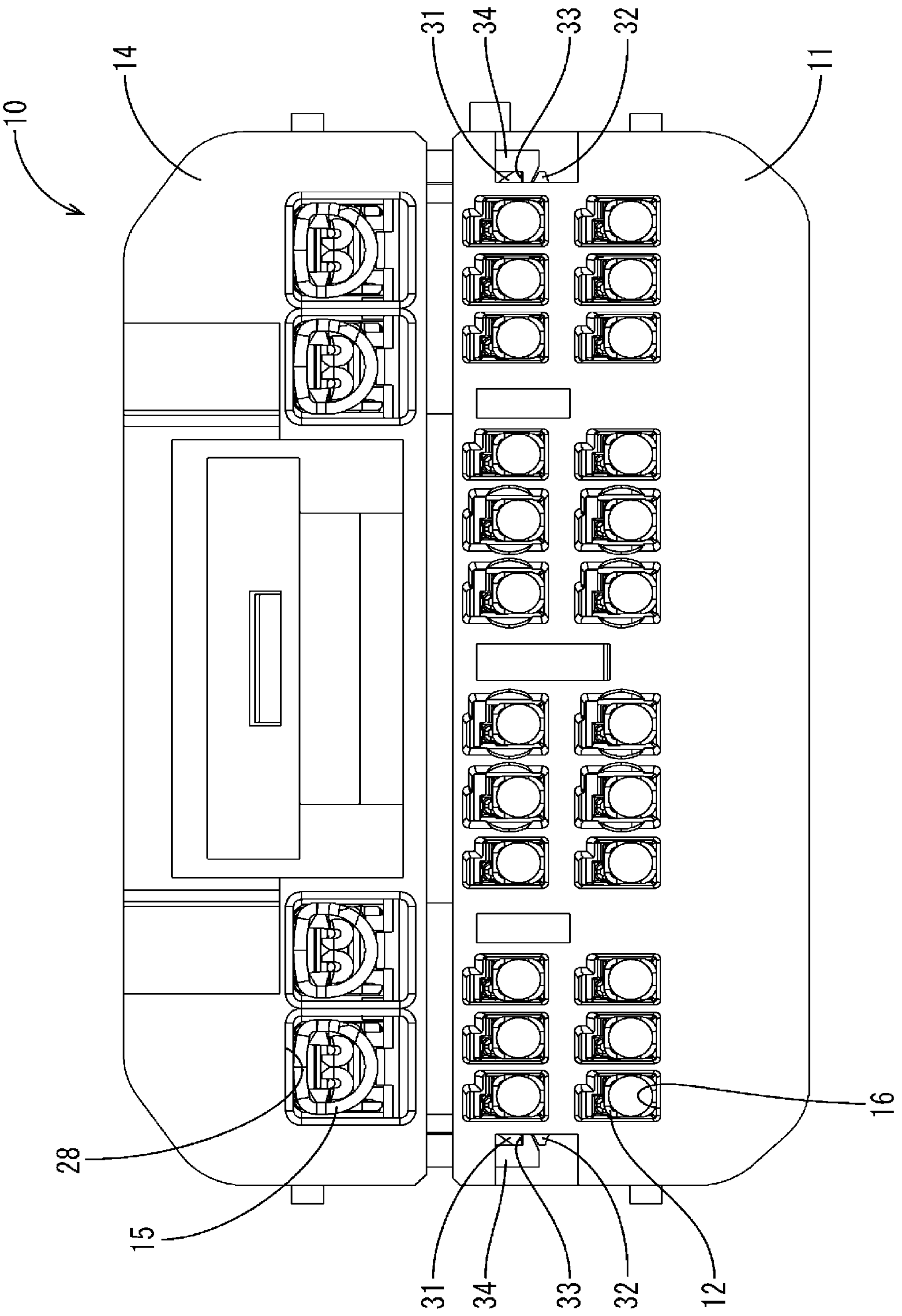
FIG. 4 is a back view showing a state where the lid member is held at a partial locking position with respect to a connector housing.
Figure 5:
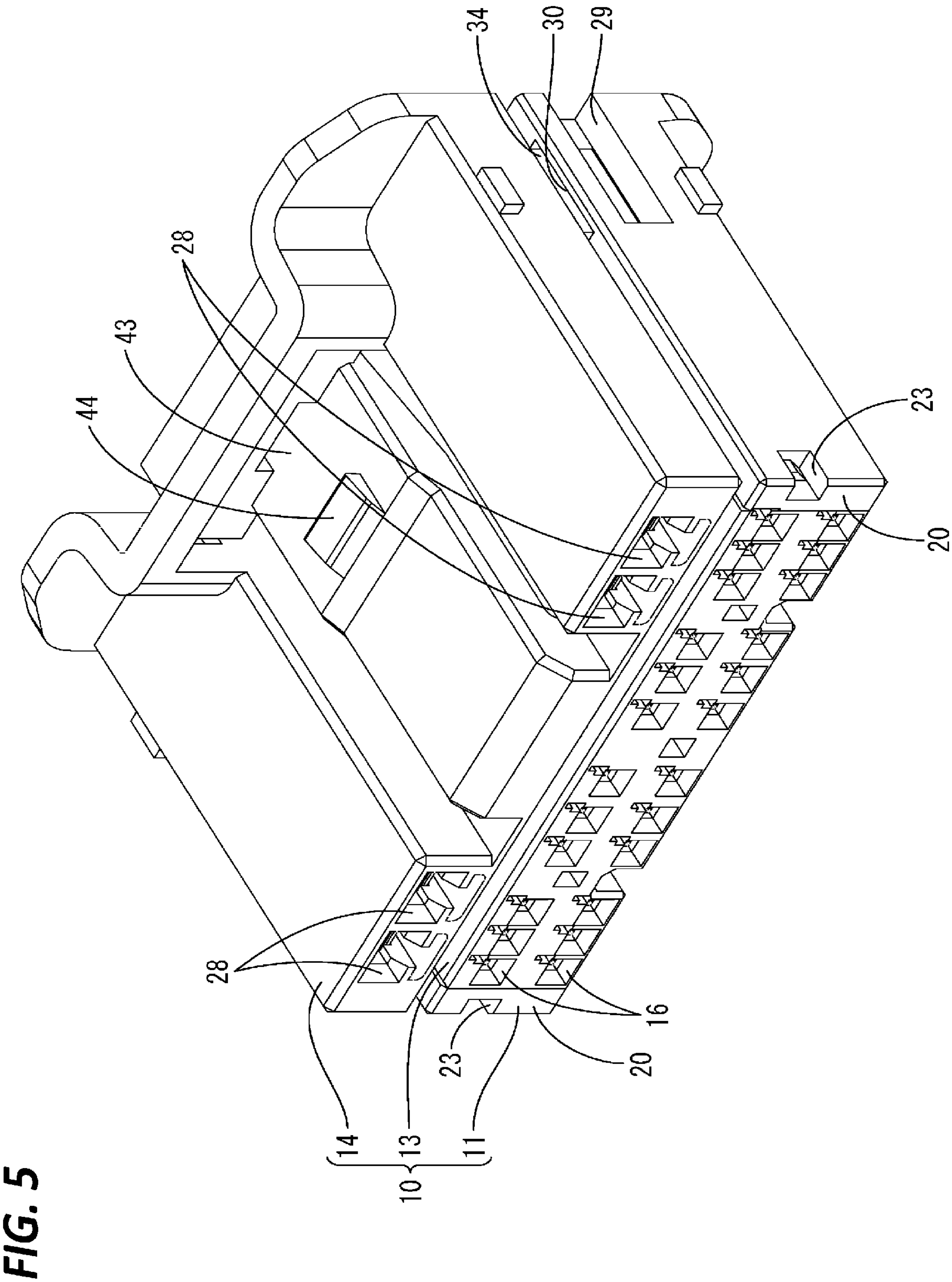
FIG. 5 is a perspective view showing the state where the lid member is held at the partial locking position with respect to the connector housing.

As shown in FIG. 4, the lid member 14 is held at the partial locking position with respect to the connector housing 11 by fitting the partial locking portions 31 into the locking grooves 33 of the locking pieces 34. As shown in FIG. 5, the lower surface of the lid member 14 and the upper surface of the connector housing 11 are separated with the lid member 14 held at the partial locking position.

Figure 6:
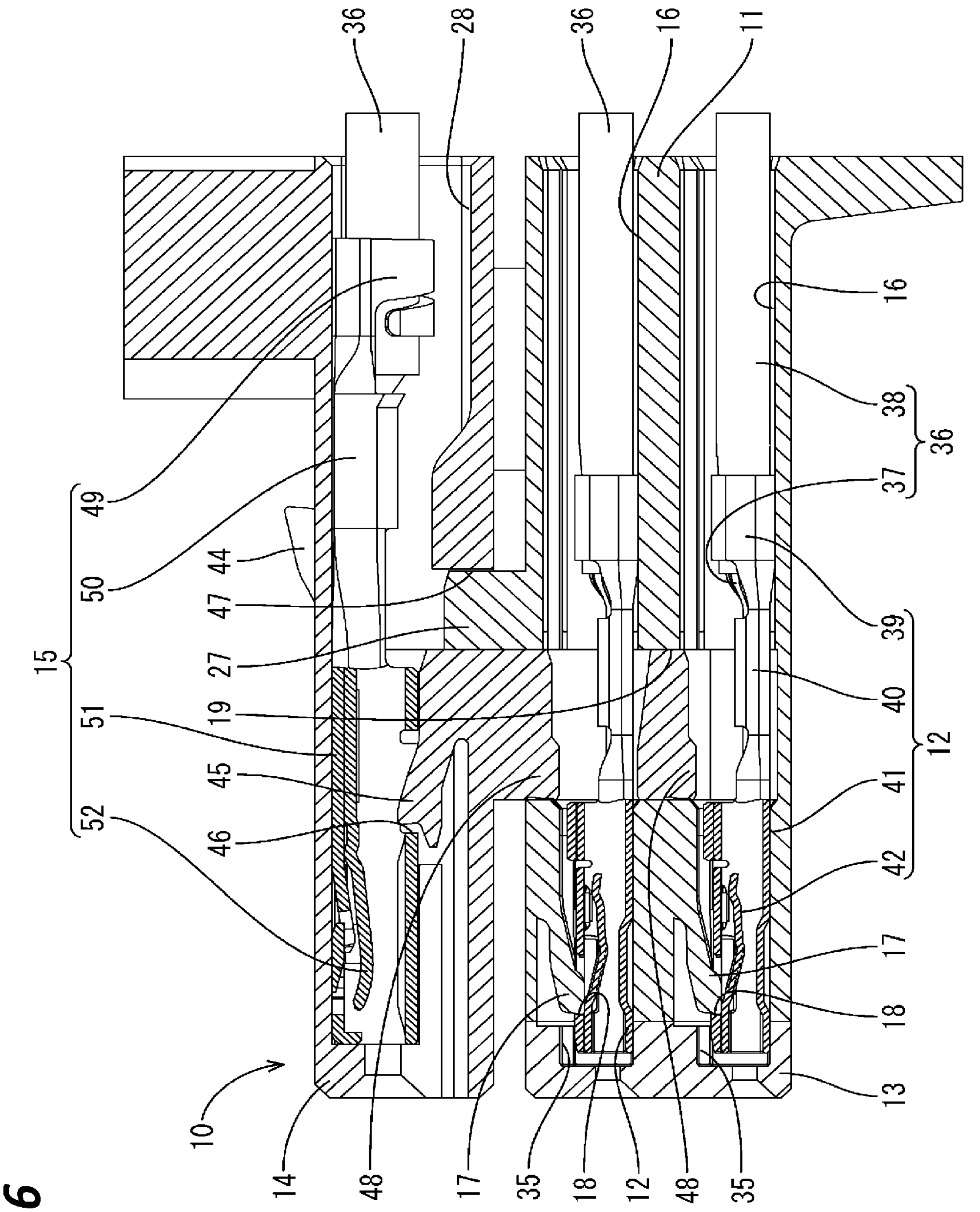
FIG. 6 is a section showing the state where the lid member is held at the partial locking position with respect to the connector housing.

As shown in FIG. 6, with the lid member 14 held at the partial locking position, the first terminal retainer portion 48 of the lid member 14 does not interfere with the first terminals 12 being inserted into the first cavities 16 and the front cavities 35 from behind. Further, with the lid member 14 held at the partial locking position, the second terminal retainer portions 27 of the connector housing 11 do not interfere with the second terminals 15 being inserted into the second cavities 28 from behind.

Figure 7:
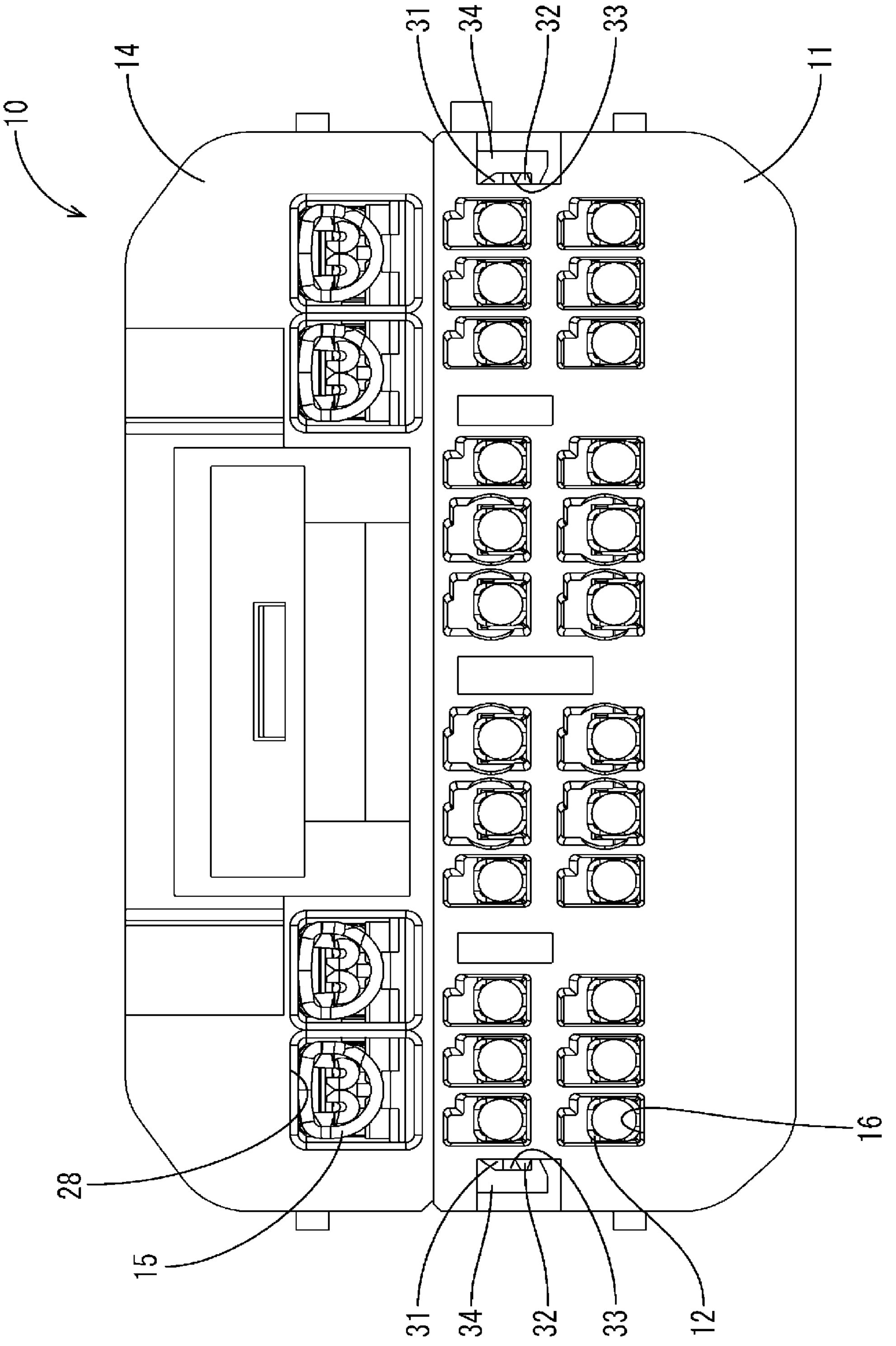
FIG. 7 is a back view showing a state where the lid member is held at a full locking position with respect to the connector housing.
Figure 8:
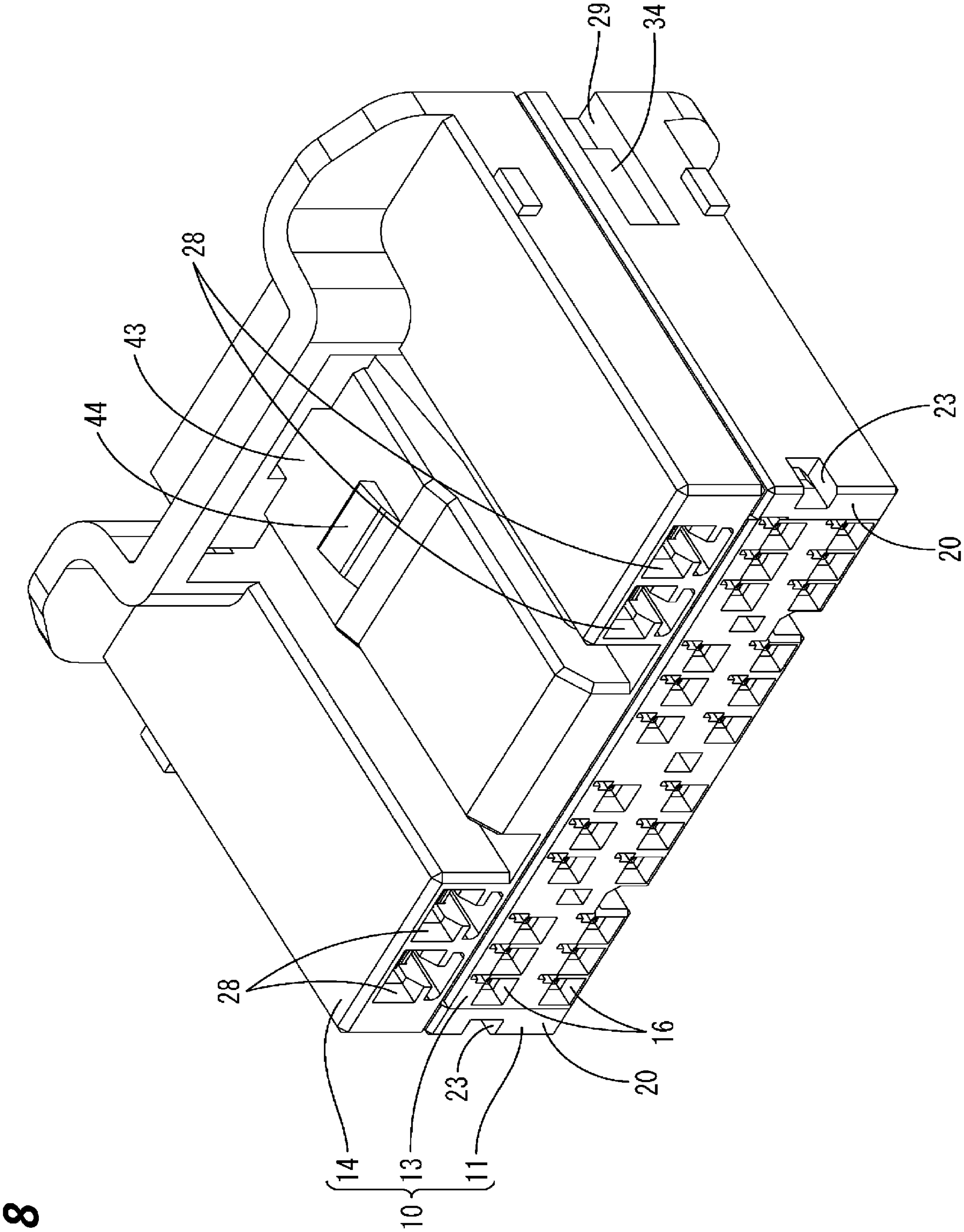
FIG. 8 is a perspective view showing the state where the lid member is held at the full locking position with respect to the connector housing.
Figure 9:
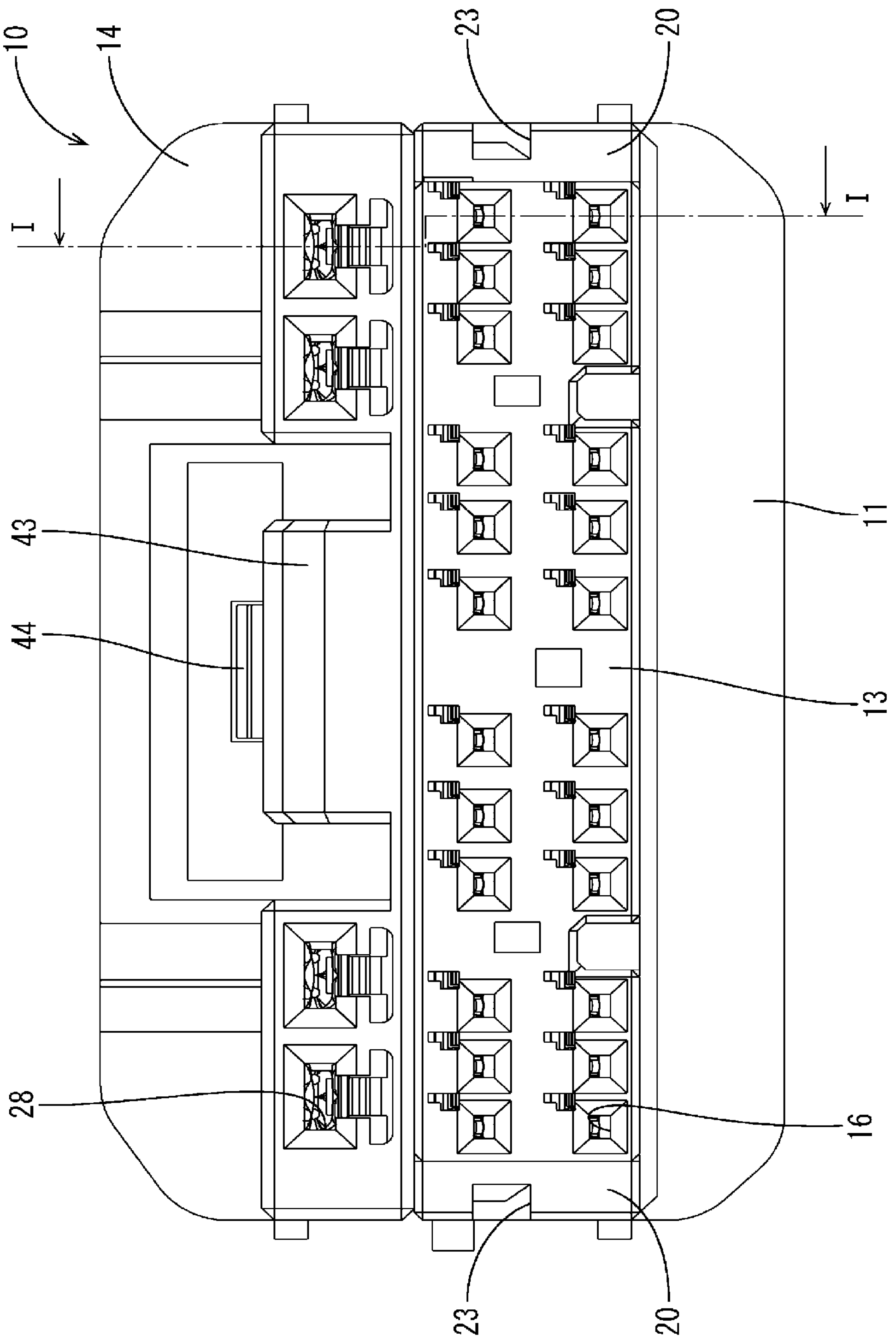
FIG. 9 is a front view showing the state where the lid member is held at the full locking position with respect to the connector housing.

As shown in FIG. 7, the lid member 14 is held at the full locking position with respect to the connector housing 11 by fitting the full locking portions 32 into the locking grooves 33 of the locking pieces 34. As shown in FIGS. 8 and 9, with the lid member 14 held at the full locking position, the lower surface of the lid member 14 and the upper surface of the connector housing 11 are in contact.

As shown in FIG. 1, with the lid member 14 held at the full locking position, the first terminal retainer portion 48 of the lid member 14 locks rear end parts of the connecting tube portions 41 of the first terminals 12 inserted into the first cavities 16 and the front cavities 35 from behind. Further, with the lid member 14 held at the full locking position, the second terminal retainer portions 27 of the connector housing 11 lock rear end parts of the connecting tube portions 51 of the second terminals 15 inserted into the second cavities 28 from behind.

[Assembling Process of Connector 10]

Next, an assembling process of the connector 10 according to this embodiment is described. First, the front mask 13 is assembled with the front end part of the connector housing 11. The side guide ribs 22 of the front mask 13 are inserted into the engaging grooves 21 of the connector housing 11 from above, and the rear guide ribs 26 of the front mask 13 are inserted into the guide grooves 25 of the connector housing 11 from above. The engaging claws 24 of the side guide ribs 22 are engaged with the opening edge parts of the front engaging recesses 23 of the connector housing 11 from below, whereby the front mask 13 is so assembled with the connector housing 11 as not to come off upward. The guide grooves 25 of the front mask 13 come into contact with the inner walls of the engaging grooves 21 from front or behind, whereby the front mask 13 is positioned in the front-rear direction with respect to the connector housing 11. The rear guide ribs 26 of the front mask 13 come into contact with the inner walls of the guide grooves 25 from left or right, whereby the front mask 13 is positioned in the lateral direction with respect to the connector housing 11.

Subsequently, the lid member 14 is assembled with the connector housing 11 from above. The locking pieces 34 of the lid member 14 are inserted into the insertion holes 30 of the connector housing 11 from above. By fitting the partial locking portions 31 into the locking grooves 33 of the locking pieces 34, the partial locking portions 31 are locked to the inner walls of the locking grooves 33. In this way, the lid member 14 is held at the partial locking position with respect to the connector housing 11 (see FIGS. 4, 5 and 6).

With the lid member 14 held at the partial locking position with respect to the connector housing 11, the first terminals 12 are inserted into the first cavities 16 of the connector housing 11 from behind. With the lid member 14 held at the partial locking position with respect to the connector housing 11, the first terminal retainer portion 48 is located at a position not to interfere with the first terminals 12 being inserted into the first cavities 16 from behind.

If the first terminal 12 is inserted into the first cavity 16 from behind, the first locking lance 17 contacts the connecting tube portion 41 of the first terminal 12 and is resiliently deformed upward. If the first terminal 12 is further pushed forward, the first locking lance 17 is resiliently restored and locked to the hole edge part of the locking hole 18 of the first terminal 12 from behind. At this time, the front end part of the connecting tube portion 41 of the first terminal 12 is in the front cavity 35 of the front mask 13.

With the lid member 14 held at the partial locking position with respect to the connector housing 11, the second terminals 15 are inserted into the second cavities 28 of the lid member 14 from behind. With the lid member 14 held at the partial locking position with respect to the connector housing 11, the second terminal retainer portions 27 are located at positions not to interfere with the second terminals 15 being inserted into the second cavities 28 from behind.

If the second terminal 15 is inserted into the second cavity 28 from behind, the second locking lance 45 contacts the connecting tube portion 51 of the second terminal 15 and is resiliently deformed downward. If the second terminal 15 is further pushed forward, the second locking lance 45 is resiliently restored and locked to the hole edge part of the locking hole 46 of the second terminal 15 from behind.

The lid member 14 moves downward by being pressed downward. The locking pieces 34 of the lid member 14 come into contact with the full locking portions 32 of the connector housing 11 from above, thereby being resiliently deformed outward in the lateral direction. If the lid member 14 is further pushed down, the locking pieces 34 are resiliently restored and the full locking portions 32 are fit into the locking grooves 33 of the locking pieces 34. In this way, the full locking portions 32 are locked to the inner walls of the locking grooves 33 and the lid member 14 is held at the full locking position with respect to the connector housing 11 (see FIGS. 1, 8 and 9).

With the lid member 14 held at the full locking position with respect to the connector housing 11, the first terminal retainer portion 48 enters the first cavities 16 and is disposed at a position rearward of the rear end parts of the connecting tube portions 41 of the first terminals 12. In this way, when the first terminal 12 is pulled rearward via the wire 36, the first terminal retainer portion 48 locks the rear end part of the connecting tube portion 41 of the first terminal 12 from behind, whereby the first terminal 12 is prevented from coming out rearward.

Further, with the lid member 14 held at the full locking position with respect to the connector housing 11, the second terminal retainer portions 27 enter the second cavities 28 and are disposed at positions rearward of the rear end parts of the connecting tube portions 51 of the second terminals 15. In this way, when the second terminal 15 is pulled rearward via the wire 36, the second terminal retainer portion 27 locks the rear end part of the connecting tube portion 51 of the second terminal 15 from behind, whereby the second terminal 15 is prevented from coming out rearward.

As shown in FIG. 1, with the lid member 14 held at the full locking position with respect to the connector housing 11, the front end part of the lid member 14 is located above the front mask 13 and is in contact with the upper surface of the front mask 13 from above. The upper surface of the front mask 13 is covered by the lid member 14.

[Functions and Effects of Embodiment]

Next, functions and effects of this embodiment are described. The connector 10 according to this embodiment includes the connector housing 11 formed with the first cavities 16 extending in the front-rear direction, the first terminals 12 accommodated in the first cavities 16, the front mask 13 to be attached to the front end part of the connector housing 11 and the lid member 14 to be mounted on the upper surface of the connector housing 11, the front mask 13 is attached to the connector housing 11 from above, the lid member 14 at least partially covers the upper surface of the front mask 13, the front mask 13 includes the front cavities 35 extending in the front-rear direction, and the front end parts of the first terminals 12 are accommodated in the front cavities 35.

Since the lid member 14 at least partially covers the upper surface of the front mask 13, upward detachment of the front mask 13 is suppressed.

Since the front end parts of the first terminals 12 are accommodated in the front cavities 35, a length in the front-rear direction of the connector housing 11 can be shortened. In this way, the connector 10 can be reduced in size in the front-rear direction.

According to this embodiment, the first terminal retainer insertion recess 19 open upward and communicating with the first cavities 16 is provided in the upper wall of the connector housing 11, the lid member 14 is provided with the first terminal retainer portion 48 projecting downward, and the first terminal retainer portion 48 enters the first terminal retainer insertion recess 19 and the first cavities 16 to lock the first terminals 12 accommodated in the first cavities 16 with the lid member 14 assembled with the connector housing 11.

Since the first terminals 12 can be locked by the lid member 14, it is not necessary to provide a retainer for the first terminals 12. In this way, the number of components of the connector 10 can be reduced.

According to this embodiment, the lid member 14 is formed with the second cavities 28 extending in the front-rear direction, and the second terminals 15 different from the first terminals 12 are accommodated in the second cavities 28.

Since the second terminals 15 can be accommodated in the lid member 14, the number of the terminals capable of being accommodated in the connector 10 can be increased as a whole.

According to this embodiment, the lid member 14 is provided with the second terminal retainer insertion recesses 47 open downward and communicating with the second cavities 28, the second terminal retainer portions 27 projecting upward are provided on the upper wall of the connector housing 11, and the second terminal retainer portions 27 enter the second terminal retainer insertion recesses 47 and the second cavities 28 to lock the second terminals 15 accommodated in the second cavities 28 with the lid member 14 assembled with the connector housing 11.

Since the second terminals 15 can be locked by the second terminal retainer portions 27, it is not necessary to provide a retainer for the second terminals 15. In this way, the number of components of the connector 10 can be reduced.

According to this embodiment, the lock portion 44 to be engaged with the mating connector is provided on the upper surface of the lid member 14.

Since the lid member 14 is provided with the lock portion 44, the connector 10 and the mating connector can be engaged.

Second Embodiment

Figure 10:
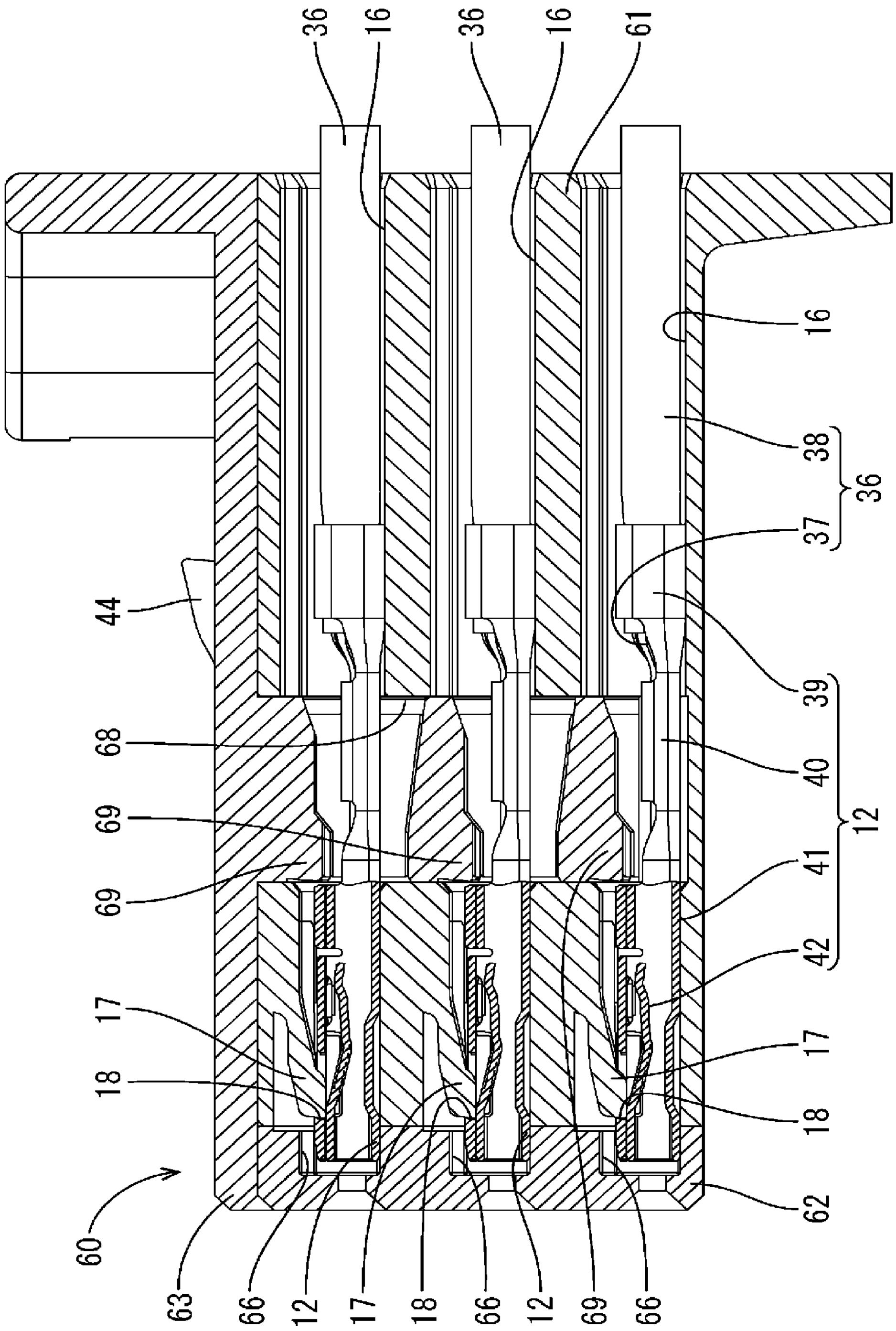
FIG. 10 is a section along X-X of FIG. 15 showing a connector according to a second embodiment.

Next, a connector 60 according to a second embodiment of the present disclosure is described with reference to FIGS. 10 to 15. As shown in FIG. 10, the connector 60 according to this embodiment includes a connector housing 61, first terminals 12 to be accommodated into the connector housing 61, a front mask 62 to be attached to a front end part of the connector housing 61 and a lid member 63 to be mounted on an upper side of the connector housing 61.

[Connector Housing 61]

Figure 11:
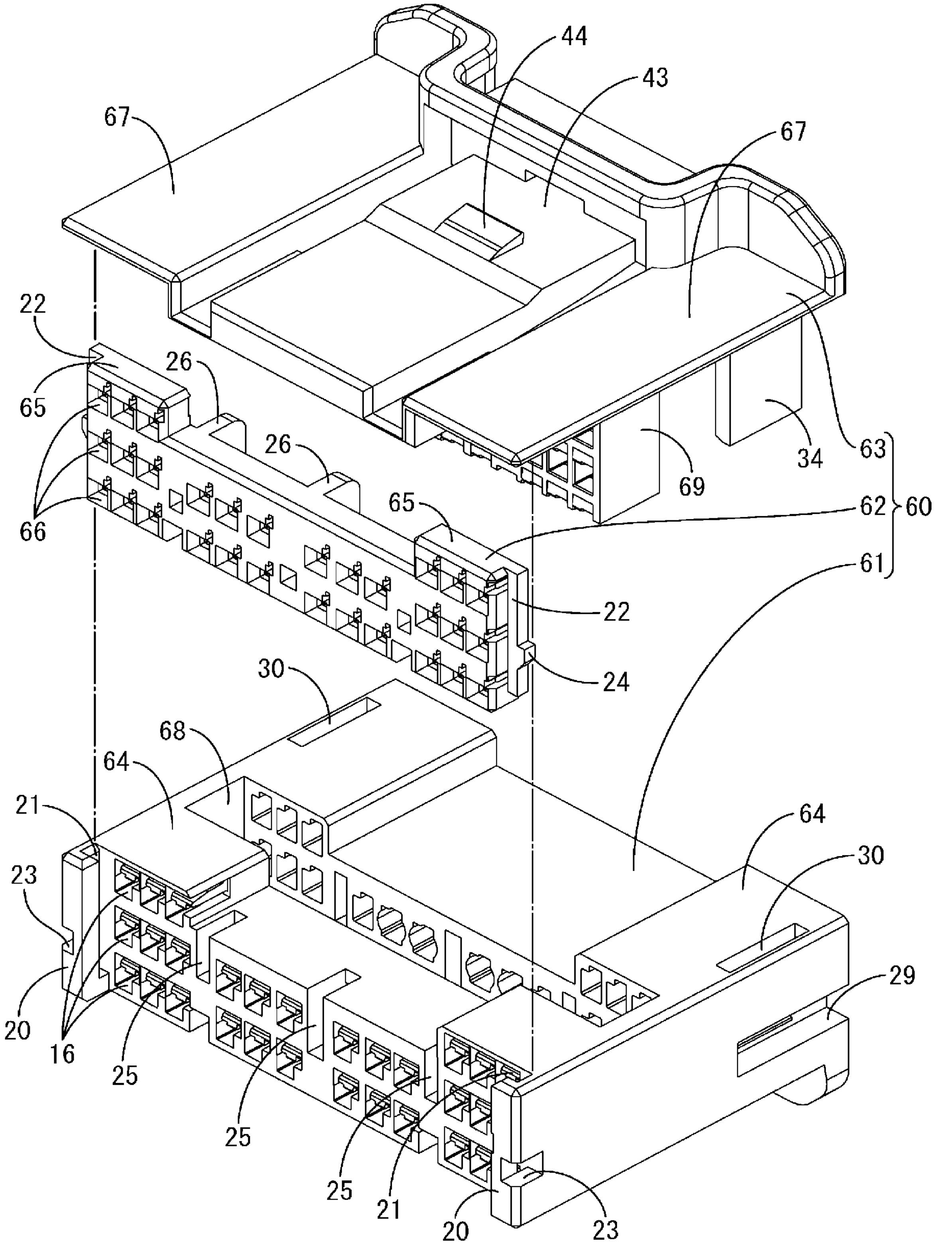
FIG. 11 is an exploded perspective view of the connector.

As shown in FIG. 11, the connector housing 61 according to this embodiment is formed with housing side projecting portions 64 projecting upward in parts near both left and right end parts. In the connector 61, a plurality of first cavities 16 are arranged in a row in a lateral direction in each of a plurality of stages (three stages in this embodiment) in a vertical direction.

As described above, the connector housing 61 is formed with the rows of the first cavities 16 arranged in the lateral direction in three upper, middle and lower stages. In this embodiment, twelve first cavities 16 are arranged in the lateral direction in each of the rows of the first cavities 16 in the middle and lower stages.

In this embodiment, six first cavities 16 are arranged in the upper stage. The six first cavities 16 include three first cavities 16 formed side by side in the housing side projecting portion 64 formed in the left end part of the connector housing 61 and three first cavities 16 formed side by side in the housing side projecting portion 64 formed in the right end part.

[Front Mask 62]

As shown in FIG. 11, the front mask 62 according to this embodiment is in the form of a plate elongated in the lateral direction and flat in a front-rear direction. Front mask side projecting portions 65 projecting upward are respectively formed at positions corresponding to the housing side projecting portions 64 of the connector housing 61 in both left and right end parts of the front mask 62. The front mask side projecting portion 65 is formed with front cavities 66 at positions corresponding to the respective first cavities 16 formed in the upper stage of the connector housing 61.

Front cavities 66 are also formed at positions corresponding to the first cavities 16 formed in the middle and lower stages, out of the first cavities 16 formed in the connector housing 61, in a part of the front mask 62 below the front mask side projecting portions 65. Front end parts of connecting tube portions 41 of the first terminals 12 are located in these front cavities 66.

[Lid Member 63]

As shown in FIG. 11, the lid member 63 according to this embodiment is in the form of a plate flat in the vertical direction. Lid side protruding portions 67 extending in the front-rear direction and projecting upward are formed at positions corresponding to the housing side projecting portions 64 of the connector housing 61 in both left and right end parts of the lid member 63.

Figure 12:
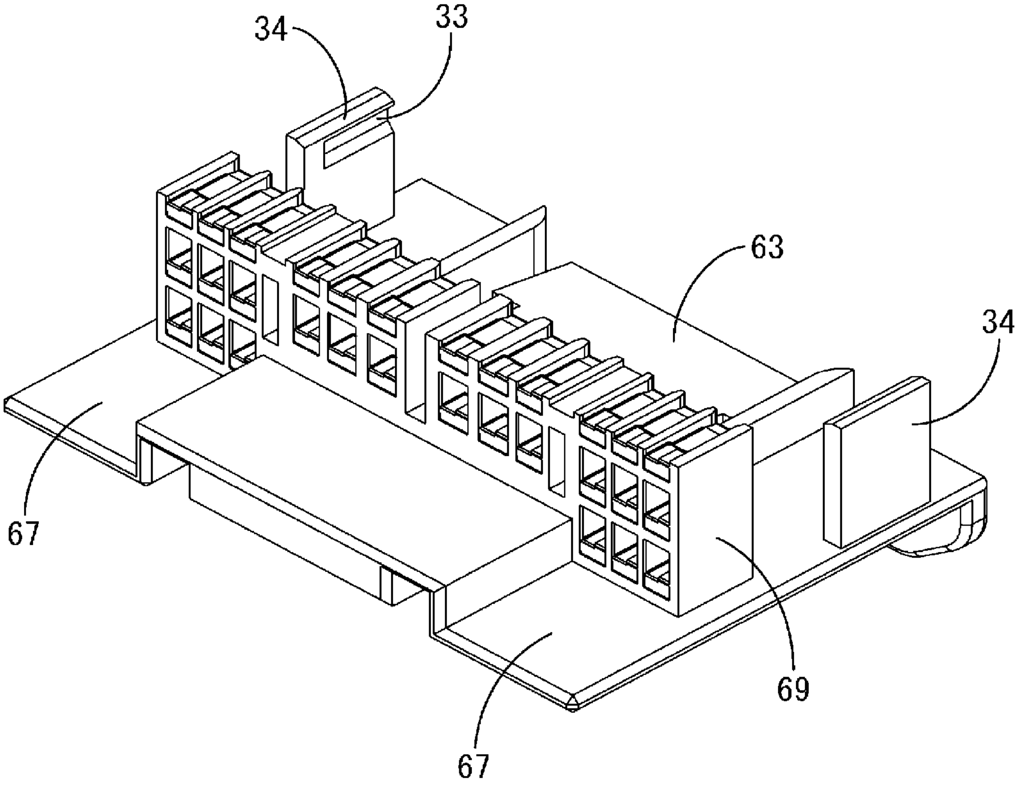
FIG. 12 is a perspective view showing a lower surface of a lid member.

As shown in FIG. 12, a first terminal retainer portion 69 projecting downward is formed at a position corresponding to the first terminal retainer insertion recess 68 of the connector housing 61 on the lower surface of the lid member 63. The first terminal retainer portion 69 is in the form of a wall extending in the lateral direction. The outer shape of the first terminal retainer portion 69 is set same as or somewhat smaller than the inner shape of the first terminal retainer insertion recess 68 of the connector housing 61. The first terminal retainer portion 69 is formed to be insertable into the first terminal retainer insertion recess 68 with the lid member 63 assembled with the connector housing 61.

Figure 13:
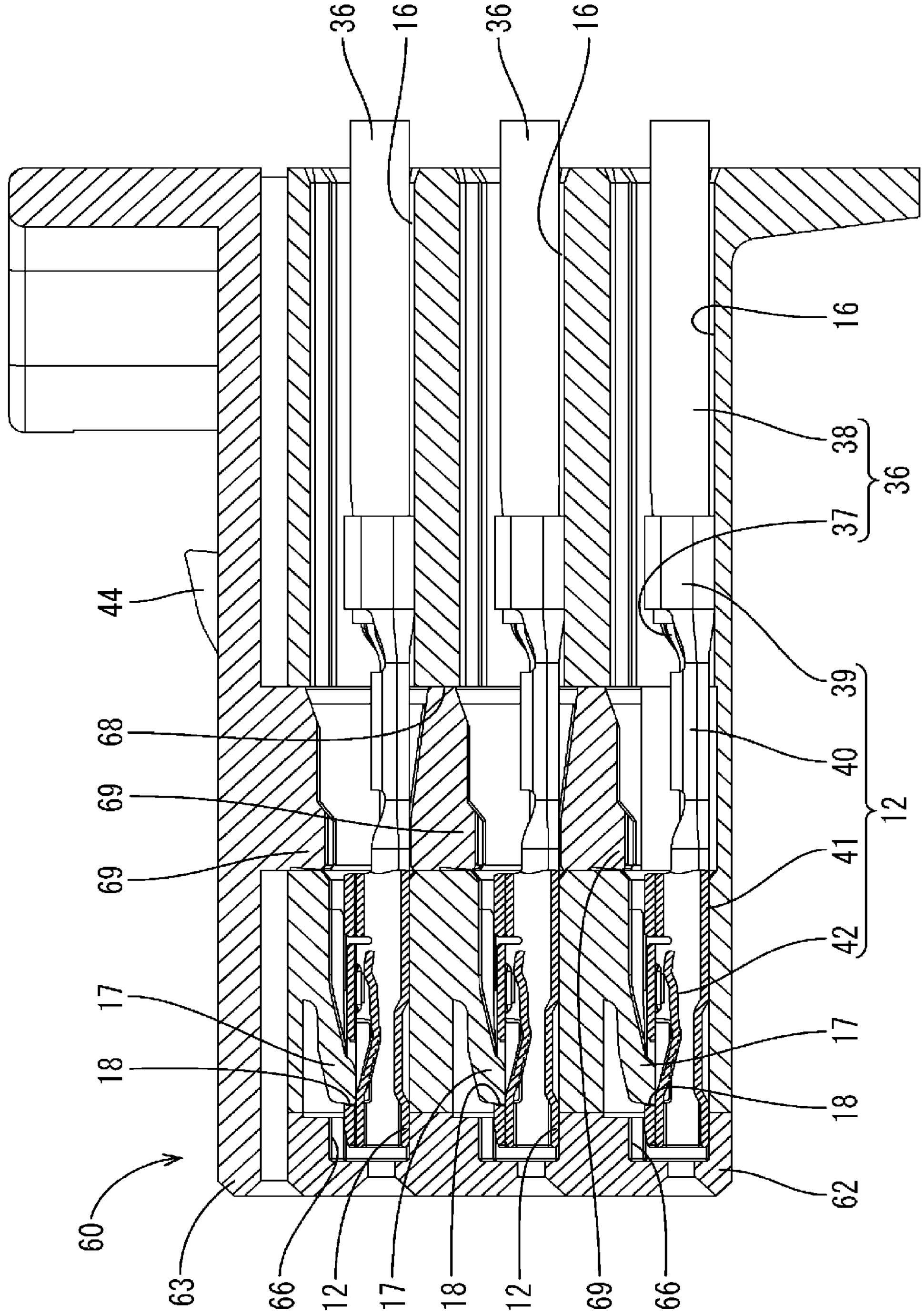
FIG. 13 is a section showing a state where the lid member is held at a partial locking position with respect to a connector housing.

As shown in FIG. 13, with the lid member 63 held at a partial locking position with respect to the connector housing 61, the first terminal retainer portion 69 is located at a position not to interfere with the first terminals 12 being inserted into the first cavities 16 from behind.

As shown in FIG. 10, with the lid member 63 held at a full locking position with respect to the connector housing 61, the first terminal retainer portion 69 enters the first cavities 16 and is disposed at a position rearward of rear end parts of the connecting tube portions 41 of the first terminals 12. In this way, when the first terminal 12 is pulled rearward via a wire 36, the first terminal retainer portion 69 locks the rear end part of the connecting tube portion 41 of the first terminal 12 from behind, whereby the first terminal 12 is prevented from coming out rearward.

Figure 14:
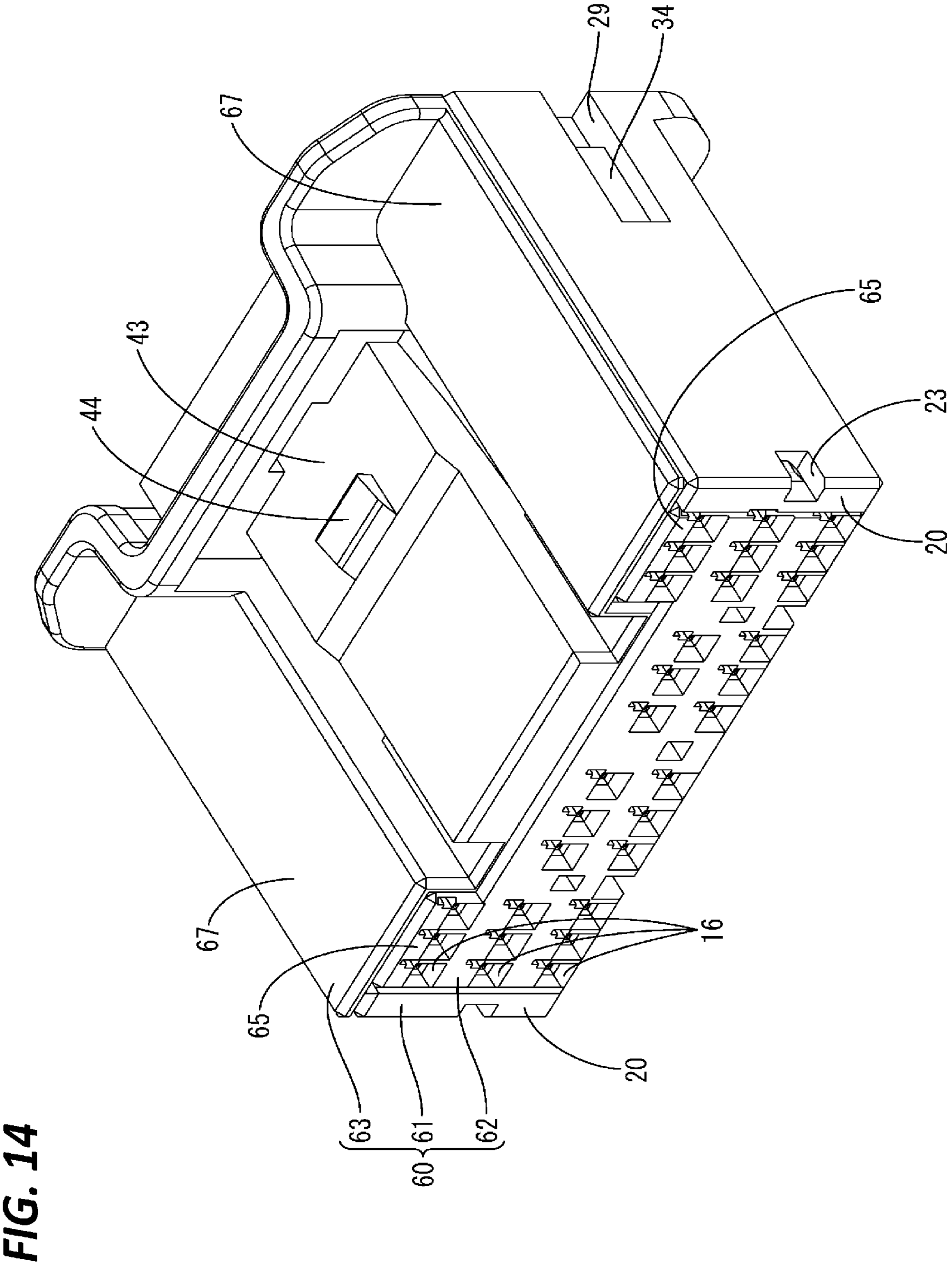
FIG. 14 is a perspective view showing a state where the lid member is held at a full locking position with respect to the connector housing.
Figure 15:
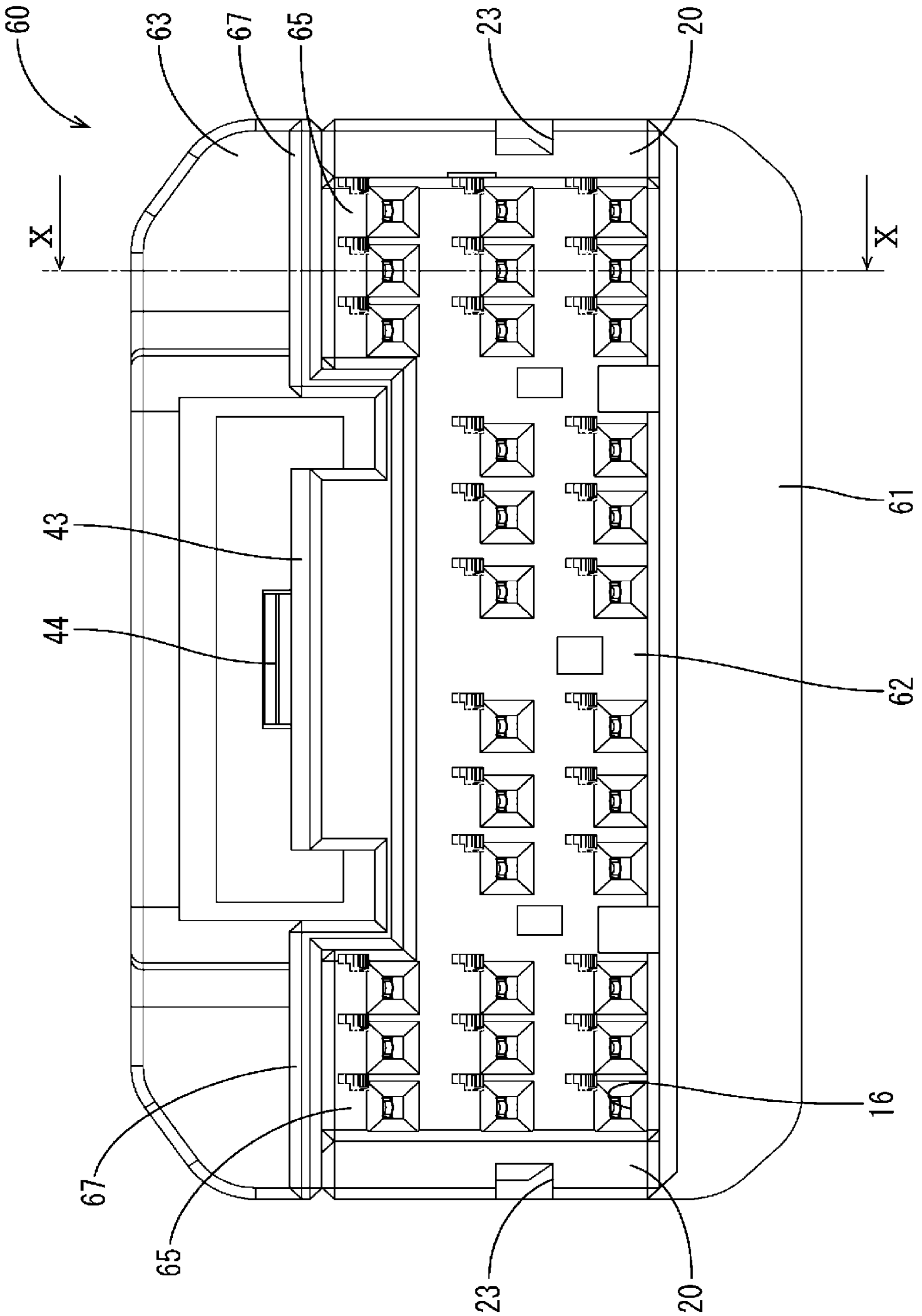
FIG. 15 is a front view showing the state where the lid member is held at the full locking position with respect to the connector housing.

As shown in FIGS. 14 and 15, with the lid member 63 held at the full locking position with respect to the connector housing 61, a front end part of the lid member 63 is located above the front mask 62 and in contact with the upper surface of the front mask 62 from above. The upper surface of the front mask 62 is covered by the lid member 63.

Since the configuration other than the above is substantially similar to that of the first embodiment, the same members are denoted by the same reference signs and repeated description is omitted.

According to this embodiment, since the lid member 63 covers the upper surface of the front mask 62, upward detachment of the front mask 62 is suppressed.

Since front end parts of the first terminals 12 are accommodated in the front cavities 66, a length in the front-rear direction of the connector housing 61 can be shortened. In this way, the connector 60 can be reduced in size in the front-rear direction.

Other Embodiments (1) The connector housing may be provided with a plurality of cavities arranged in a row in the lateral direction only in one stage, or rows of cavities in four or more stages may be provided to overlap in the vertical direction.

(2) Although the second cavities 28 are arranged laterally in a row in the lid member 14 according to the first embodiment, there is no limitation to this and the lid member 14 may be provided with second cavities 28 overlapping in two or more stages in the vertical direction.

(3) Although the lid member 14, 63 according to the first and second embodiments is configured to cover the upper surface of the front mask 13, 62, there is no limitation to this. A part of the upper surface of the front mask 13, 62 may be covered by the lid member 14, 63 and another part may be exposed.

LIST OF REFERENCE NUMERALS

10, 60: connector
11, 61: connector housing
12: first terminal
13, 62: front mask
14, 63: lid member
15: second terminal
16: first cavity
17: first locking lance
18: locking hole
19, 68: first terminal retainer insertion recess
20: extending wall
21: engaging groove
22: side guide rib
23: front engaging recess
24: engaging claw
25: guide groove
26: rear guide rib
27: second terminal retainer portion
28: second cavity
29: rear engaging recess
30: insertion hole

31: partial locking portion
32: full locking portion
33: locking groove
34: locking piece
35, 66: front cavity
36: wire
37: core wire
38: insulation coating
39, 49: insulation barrel
40, 50: wire barrel
41, 51: connecting tube portion
42, 52: resilient piece
43: lock arm
44: lock portion
45: second locking lance
46: locking hole
47: second terminal retainer insertion recess
48, 69: first terminal retainer portion
64: housing side projecting portion
65: front mask side projecting portion
67: lid side protruding portion

What is claimed is:

1. A connector, comprising:

a connector housing formed with a first cavity extending in a front-rear direction;

a first terminal accommodated in the first cavity;

a front mask to be attached to a front end part of the connector housing; and a lid member to be mounted on an upper surface of the connector housing, wherein:

the front mask is attached to the connector housing from above, the lid member at least partially covers an upper surface of the front mask, the front mask includes a front cavity extending in the front-rear direction, a front end part of the first terminal is accommodated in the front cavity, a first terminal retainer insertion recess open upward and communicating with the first cavity is provided in an upper wall of the connector housing, the lid member is provided with a first terminal retainer portion projecting downward, and the first terminal retainer portion enters the first terminal retainer insertion recess and the first cavity to lock the first terminal accommodated in the first cavity with the lid member assembled with the connector housing.

2. The connector of claim 1, wherein the lid member is formed with a second cavity extending in the front-rear direction and a second terminal different from the first terminal is accommodated in the second cavity.

3. The connector of claim 2, wherein:

the lid member is provided with a second terminal retainer insertion recess open downward and communicating with the second cavity, a second terminal retainer portion projecting upward is provided on an upper wall of the connector housing, and the second terminal retainer portion enters the second terminal retainer insertion recess and the second cavity to lock the second terminal accommodated in the second cavity with the lid member assembled with the connector housing.

4. The connector of claim 1, wherein a lock portion to be engaged with a mating connector is provided on an upper surface of the lid member.

5. A connector, comprising:

a connector housing formed with a first cavity extending in a front-rear direction;

a first terminal accommodated in the first cavity;

a front mask to be attached to a front end part of the connector housing; and a lid member to be mounted on an upper surface of the connector housing, wherein:

the front mask is attached to the connector housing from above, the lid member at least partially covers an upper surface of the front mask, the front mask includes a front cavity extending in the front-rear direction, a front end part of the first terminal is accommodated in the front cavity, the lid member is formed with a second cavity extending in the front-rear direction, and a second terminal different from the first terminal is accommodated in the second cavity.

* * * * *